…

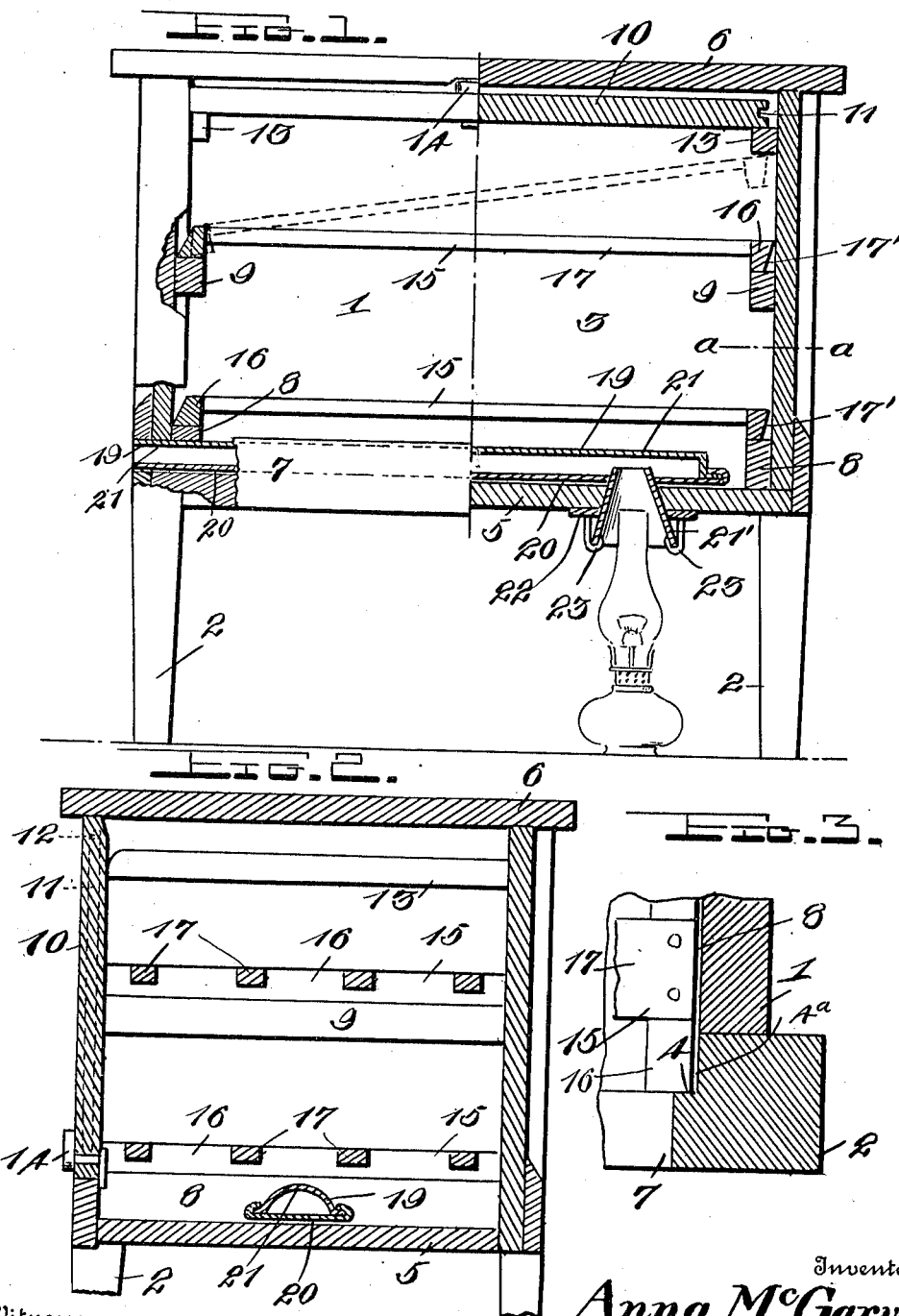

UNITED STATES PATENT OFFICE.

ANNA McGARVEY, OF WESTOVER, PENNSYLVANIA.

CABINET AND DOUGH-RAISER.

1,019,815.  Specification of Letters Patent.  Patented Mar. 12, 1912.

Application filed August 26, 1911. Serial No. 646,222.

*To all whom it may concern:*

Be it known that I, ANNA McGARVEY, a citizen of the United States, residing at Westover, in the county of Clearfield and State of Pennsylvania, have invented certain new and useful Improvements in Cabinets and Dough-Raisers, of which the following is a specification, reference being had to the accompanying drawings.
This invention is an improved cabinet and dough raiser and consists in the construction, combination and arrangement of devices hereinafter described and claimed, the object of the invention being to provide an improved article of this kind which may be used both for the purposes of raising dough and as a kitchen cabinet for the storage of articles of food or other commodities.

In the accompanying drawings, Figure 1 is partly a side elevation and partly a vertical longitudinal sectional view of a cabinet and dough raiser constructed in accordance with my invention; Fig. 2 is a vertical transverse sectional view of the same. Fig. 3 is a detail horizontal sectional view on the plane indicated by the line *a—a* of Fig. 1.

In accordance with my invention I provide a cabinet 1, preferably of oblong rectnagular form, and provided at its corners with supporting legs 2. The cabinet is open at its front side as at 3 and the upper portions of the front legs are recessed on the inner sides as at 4ª to form vertical flanges or shoulders 4 at the ends of the cabinet and between the bottom 5 and the top 6 thereof. The cabinet is also here shown as constructed with a front strip 7 which rises from the bottom and forms the lower side of the opening 3. In the ends of the cabinet and secured to the end walls thereof are cross strips or cleats 8 the lower sides of which bear on the bottom of the cabinet. At a suitable distance above the cleats 8 are cleats 9 which are also secured to the inner sides of the end walls of the cabinet and the outer ends of which bear against the shoulders or flanges 4. The front side of the cabinet is provided with a door 10 in the ends of which are slots 11 which are engaged by pins 12 which project from the opposing sides of the upper portions of the front legs at points a slight distance below the top of the cabinet. Thereby the door is adapted to be swung angularly, pivotally, upon the said pins, to close or uncover the front of the cabinet and when the door has been raised to a horizontal position it may then be moved inwardly under the top of the cabinet, supporting cleats 13 being provided for the door, which cleats are secured to the inner sides of the end walls of the cabinet. The door is also provided with a suitable fastening device 14 to engage the flange formed by the strip 7 when the door is in a closed position, so as to lock the door or secure it in said position. The cabinet is also provided with removable shelves 15 each of which is here shown as composed of a pair of end bars 16 and a suitable number of spaced connecting bars 17. The ends of the shelves bear on the cleats 8, 9 of the cabinet so that the shelves are supported by the said cleats. Each end bar of each of the shelves is rounded or inclined at the outer sides next one end of the cabinet, as at 17′. The extreme length of the shelves is very slightly less than that of the space between the opposed surfaces of the end walls of the cabinet. The inclines or bevels 17′ at opposite ends of each shelf are oppositely arranged. Hence each shelf may be raised at either end, while its opposite end bears on one of the cleats and when thus raised, the shelf may then be moved lengthwise slightly, a sufficient distance to cause its end bars to clear the shoulders or flanges 4 and thereby permit the shelf to be withdrawn from the cabinet. When the shelf is in the cabinet, in a normal horizontal position, bearing on its supporting cleats, its end bars project beyond the opposing sides of the shoulders or flanges 4 and hence the latter lock the shelf in place and prevent its being casually taken out from the cabinet. But either shelf may be readily taken out from the cabinet by first raising it in an inclined position so as to enable its end bars to clear the shoulders 4 which form stop members of the cabinet.

To adapt the cabinet for use for dough raising and for other similar purposes I provide a heating flue 19. This heating flue is disposed lengthwise in the cabinet, a slight distance above the bottom thereof, one end of the heating flue extending through an opening in one end wall of the cabinet and being open, the other end of the heating flue being closed and terminating short of the opposite end wall of the cabinet. The heating flue comprises a flat bottom plate 20 and a transversely curved, substantially semicircular, upper plate 21, the side edges of which are out-turned and united to those of the bottom plate. An intake funnel 21 which is conical in form and passes through an opening in the bottom of the cabinet, has its upper end connected to and extending through the bottom plate of the heating flue, near the closed end of the latter. A plate 22 is secured on the under side of the bottom of the cabinet around an opening therein and has an opening through which the intake funnel extends and the lower edge of the intake funnel is engaged, and the funnel and the inner end of the heating flue are held by hooks 23 which are secured to the bottom of the cabinet and pass through the plate 22.

A suitable lamp is, in practice, used in connection with the device and is placed under the intake funnel so that the heated air and products of combustion which rise from the chimney of the lamp pass through the intake funnel into the heating flue and pass longitudinally through the heating flue and is discharged at one end of the cabinet, the heating flue, as will be understood, serving to heat the air in the cabinet to a sufficient degree to cause the dough placed in the cabinet to be raised. The cabinet can also be employed for keeping any desired articles heated to a moderate degree.

Having thus described my invention, I claim:—

1. A cabinet of the class described provided near and above its bottom with a longitudinally disposed heating flue closed at one end and open at the opposite end, the open end of the flue extending through and being supported in an opening in one end wall of the cabinet and communicating with the outer air, an intake funnel extending through the bottom of the cabinet and communicating at its upper end with the flue, near and supporting the closed end of the flue.

2. A cabinet of the class described provided near and above its bottom with a longitudinally disposed heating flue closed at one end and open at the opposite end, the open end of the flue extending through and being supported in an opening in one end wall of the cabinet and communicating with the outer air, an intake funnel extending through the bottom of the cabinet and communicating at its upper end with the flue, near and supporting the closed end of the flue, a protecting plate on the under side of the bottom of the cabinet and around the intake flue and hooks secured to the bottom of the cabinet, and attached to the lower end of and securing the intake funnel.

In testimony whereof I hereunto affix my signature in the presence of two witnesses.

ANNA McGARVEY.

Witnesses:
R. H. McGarvey,
Minta McGarvey.

---

Copies of this patent may be obtained for five cents each, by addressing the "Commissioner of Patents, Washington, D. C."